United States Patent

Neko et al.

[11] Patent Number: 6,163,130
[45] Date of Patent: Dec. 19, 2000

[54] INJECTION MOLDING MACHINE

[75] Inventors: Noriaki Neko, Fujiyoshida; Shunsuke Matsubara, Minamitsuru-gun; Yasusuke Iwashita, Oshino-mura; Hiroyuki Kawamura, Minamitsuru-gun, all of Japan

[73] Assignee: Fanuc, Ltd., Yamanashi, Japan

[21] Appl. No.: 09/202,598

[22] PCT Filed: Apr. 21, 1998

[86] PCT No.: PCT/JP98/01827

§ 371 Date: Dec. 17, 1998

§ 102(e) Date: Dec. 17, 1998

[87] PCT Pub. No.: WO98/48507

PCT Pub. Date: Oct. 29, 1998

[30] Foreign Application Priority Data

Apr. 21, 1997 [JP] Japan .................................. 9-116067

[51] Int. Cl.[7] .................................................. H02P 21/00
[52] U.S. Cl. .......................... 318/806; 318/671; 318/798; 318/432
[58] Field of Search .................................. 318/798–801, 318/807–811, 806, 671, 432, 433

[56] References Cited

U.S. PATENT DOCUMENTS

| 5,644,206 | 7/1997 | Yura .................................. 318/807 |
| 5,701,066 | 12/1997 | Matsuura et al. .................... 318/808 |
| 5,747,957 | 5/1998 | Hayashida .......................... 318/799 |
| 5,796,236 | 8/1998 | Royak ................................ 318/804 |
| 5,814,967 | 9/1998 | Graces et al. ....................... 318/807 |
| 5,821,727 | 10/1998 | Yura .................................. 318/809 |
| 5,905,644 | 5/1999 | Blasko et al. ...................... 363/41 |
| 5,963,007 | 10/1999 | Toyozawa et al. .................. 318/799 |

FOREIGN PATENT DOCUMENTS

| 1-135609 | 5/1989 | Japan . |
| 4-111298 | 9/1992 | Japan . |
| 5-30774 | 2/1993 | Japan . |
| 6-014592 | 1/1994 | Japan . |
| 8-275599 | 10/1996 | Japan . |
| 8-289599 | 11/1996 | Japan . |
| 9-298899 | 11/1997 | Japan . |

OTHER PUBLICATIONS

Hoang Le–Huy et al. "Analysis and Implementation of a real–Time Predictive Current Controller for PM Synchronous Servo Drives", IEEE Transaction on industrial electronics, Vol 41, No. 1, Feb. 1994, pp110–117.

Chaofu Kao et al. "Induction Machine Control Systems with Magnetic Saturation", 0–7803–1859–5/94, IEEE 1994, pp 250–266.

M. Bodson et al. "Nonlinear Servo Control of an Induction Motor with Saturation", Proceedings of the 33re Conference on Decision and Control, Lake Buena Vista, FL, Dec. 1994, 0–7803–1968–0/ 1994 IEEE, pp 1832–1837.

*Primary Examiner*—Bentsu Ro
*Attorney, Agent, or Firm*—Staas & Halsey LLP

[57] ABSTRACT

In an injection molding machine whose movable part is driven by an AC servo motor, d-phase current in a direction of magnetic flux produced by a field system and q-phase current orthogonal to the d-phase current are obtained through d-q conversion on the basis of drive current of the AC servo motor and a phase of a rotor. Control of current is made in DC mode on condition that the d-phase current is set to zero, and the q-phase current is adapted for a current command. Control of current in the DC mode as described above is designed to advance the phase of the q-phase current command, which is an effective component of a current command at the time of the occurrence of magnetic saturation, thereby preventing, the influence of magnetic saturation to lessen the fall of torque.

6 Claims, 9 Drawing Sheets

INJECTION MOLDING MACHINE

TECHNICAL FIELD

This invention relates to an injection molding machine, in which a movable part such as a clamping part and an injection part are driven by an AC servo motor.

BACKGROUND ART

It is well known that a movable part of an injection molding machine is driven by an AC servo motor. A description will now be briefly given of an instance of an injection molding machine, in which a movable part is driven by an AC servo motor, with reference to a schematic view shown in FIG. 2.

Roughly speaking, the injection molding machine is composed of a clamping part 100 and an injection part 200. In the clamping part 100, a fixed platen 101 fixed to a base of the injection molding machine is connected to a rear platen 103 with four pieces of tie bars 104, a movable platen 102 is slidably fitted to and is guided by the tie bars 104, a mold 105 is mounted on the movable platen 102 and the fixed platen 101, and a toggle mechanism 106 is provided between the rear platen 103 and the movable platen 102.

The toggle mechanism 106 is driven through a ball screw/nut mechanism 107 by an AC servo motor Mc for clamping and then moves the movable platen 102 to open or close the mold 105 for clamping. Reference symbol Me denotes an AC servo motor for ejecting, which drives an eject mechanism 108 to eject a molded product from the movable-side mold 105. Incidentally, reference symbol M1 is a motor for mold-thickness adjustment, which moves the rear platen 103 through a pulley, a belt or the like to a position where predetermined clamping force can be exerted according to the thickness of the mold 105.

The injection part 200 is provided with a pusher plate 202 movable along guide bars provided between a front plate 201 and a rear plate 203, and a heating cylinder 204 is mounted on the front plate 201. A screw 205 is inserted into the heating cylinder 204 and is mounted on the pusher plate 202 so as to be capable of being freely revolved, while being incapable of being moved in an axial direction. Reference symbol Mm denotes an AC servo motor for metering, which revolves the screw 205 through the pulley, the belt or the like. Reference symbol Ml denotes an AC servo motor for injection, which moves the pusher plate 202 through the pulley, the belt and the ball screw/nut mechanism 206 and then moves the screw 205 in the axial direction to perform injection and hold-pressure. Further, back pressure at the time of metering is controlled also by the servo motor Ml for injection.

Reference symbol M2 denotes a motor for nozzle touch, which drives a ball screw/nut mechanism 207 and then moves the whole injection part 200 to cause a nozzle provided on the end of the heating cylinder 204 to come into contact with or be separated from the mold 105 mounted on the fixed platen 101.

In a mode of controlling drive of the AC servo motors Mc, Me, Mm and Ml which drive the movable parts (the movable platen, the eject mechanism and the revolution and axial movement of the screw) of the injection molding machine as described above, positional control is made for the movable platen, the eject mechanism and the axial movement of the screw. For such positional control, a position/speed detector is mounted on the AC servo motors Mc, Me and Ml (incidentally, these servo motors are shown by a reference numeral 4 in FIG. 3); a position control section 10 performs control of speed loop on the basis of a position command and a position feedback signal and finds a speed command, a speed control section 11 performs control of the speed loop on the basis of the speed command and a speed feedback signal and finds a torque command; a current control section 12 performs control of the current loop for each of three phases in response to the torque command and finds a voltage command corresponding to current to be supplied; and the AC servo motor is driven through a power amplifier such as an inverter on the basis of the command voltage, as shown in FIG. 3. On the other hand, for the AC servo motor Mm which revolves the screw, the control of speed loop is made without positional control (the speed command is directly inputted without providing any position control section 10 as in FIG. 3).

FIG. 4 is a block diagram of a current control mode heretofore in use for the AC servo motor. On the basis of the torque command issued from a speed loop and a rotor phase $\theta$ from a rotor phase detector provided in the AC servo motor, multiplying $\sin \theta$ by the torque command gives a U-phase current command in the U-phase (incidentally, the rotor phase is based on a U-phase); multiplying $\sin(\theta+2\pi/3)$ shifted by 120 degrees in phase by the torque command a V-phase current command in a V-phase, and multiplying $\sin(\theta-2\pi/3)$, further shifted by 120 degrees in phase, by the torque command gives a W-phase current command in a W-phase. Then, in each phase, control of the current loop in integral-plus-proportional control is made on the basis of the current command and the current feedback signal of each phase to find a voltage command (PWM command), and the servo motor is driven through a servo amplifier such as an inverter. Incidentally, in each phase current loop in FIG. 4, reference symbol K1 denotes an integrating gain, K2 is a proportional gain, R is a wire-wound resistance of the servo motor, L is its inductance. Further, reference symbol s in each phase current loop is a Laplace operator.

In the current control mode as described above, since an AC current frequency (i.e., an AC current frequency produced by the inverter) increases in proportion to an increase of the revolving speed of the servo motor, a reduction of gain and a phase lag occur based on frequency characteristics of a control system. Therefore, a power factor is degraded to present problems such as an increase of drive current and a reduction of the maximum torque.

On the other hand, the injection molding machine is designed to repeat a molding cycle continuously, and an increase of speed in the molding cycle is preferably required for the achievement of higher production efficiency. To increase the speed in the molding cycle, it is necessary to drive at higher speeds the AC servo motor which drives each movable part of the injection molding machine. However, high-speed operation causes the increase of drive current as described above. As a result, the motor tends to give off a larger amount of heat, so that the increasing drive current becomes an obstacle to the increase of the speed in the molding cycle. Further, for increasing the speed in the molding cycle, high torque is needed, however, as the reduction of the maximum torque occurs as described above, problems arise also in this point.

DISCLOSURE OF THE INVENTION

It is an object of the present invention to provide an injection molding machine which enables an increase of speed in a molding cycle.

For attaining the above object, an injection molding machine according to the present invention is designed to control the current to an AC servo motor, which drives a movable part of the injection molding machine, by making use of d-q conversion attainable by making conversion from three phases into two phases, that is, a d-phase in a direction of magnetic flux produced by a field system and a q-phase orthogonal to the d-phase.

Further, in order to control the drive of the AC servo motor, which drives a 5 movable part of the injection molding machine, the d-phase current in a direction of magnetic flux produced by a field system and q-phase current orthogonal to the d-phase current are produced through conversion from three phases into two phases on the basis of drive current of the AC servo motor and a rotor phase to obtain the feedback current; feedback control of current is performed on condition that a torque command is adapted for a q-phase current command, and a d-phase current command is set to zero, and then command voltages of the d-phase and q-phase are determined; and conversion from two phases into three phases is made on the basis of the d-phase command voltage and the q-phase command voltage to obtain the command for each phase of the AC servo motor.

It is preferable that the maximum torque is increased by making phase-lead control to allow a phase of the q-phase current to lead when the torque command is not less than a value of current which brings about magnetic saturation. Since the present invention has the above configuration, it is possible to drive the AC servo motor with high-speed, high torque and less drive current. Consequently, the amount of heat generated by the servo motor is reduced, and a molding cycle is shortened to achieve higher production efficiency. The less generation of the heat makes it also possible to reduce the capacity of a cooling equipment for the motor. Further, since high-speed and high torque can be produced, it is also possible to use a resin which requires less injection time and starts solidification immediately after injection. Besides, the improvement of motor torque causes high-speed opening/closing operation of the mold, high-speed operation of the ejector and high-speed revolution of the screw, resulting in a shortening of metering time.

Further, by carrying out phase correction (specifically, phase-lead correction), high torque can be produced at the time when the AC servo motor is at rest, so that it is possible to generate a high hold-pressure at the time when pressure is to be retained. In case of a direct-acting mold clamping device in which a movable platen is directly driven by the AC servo motor to perform mold clamping, it is also possible to produce a high torque through phase correction even when the AC servo motor is at rest.

BEST MODE OF EMBODYING THE PRESENT INVENTION

In the present invention, in controlling the current to an AC servo motor, d-q conversion is used in making conversion from three phases into two phases and vice versa as a method of not only preventing drive current from increasing due to a reduction of power factor, but also preventing the maximum torque from decreasing. The d-q conversion is intended to find and control current Id and voltage Vd in the direction of d-axis and current Iq and voltage Vq in the direction of q-axis on condition that a direction of magnetic flux produced by a field system is represented by the d-axis, while a direction orthogonal to the d-axis is represented by the q-axis.

Figure 1:
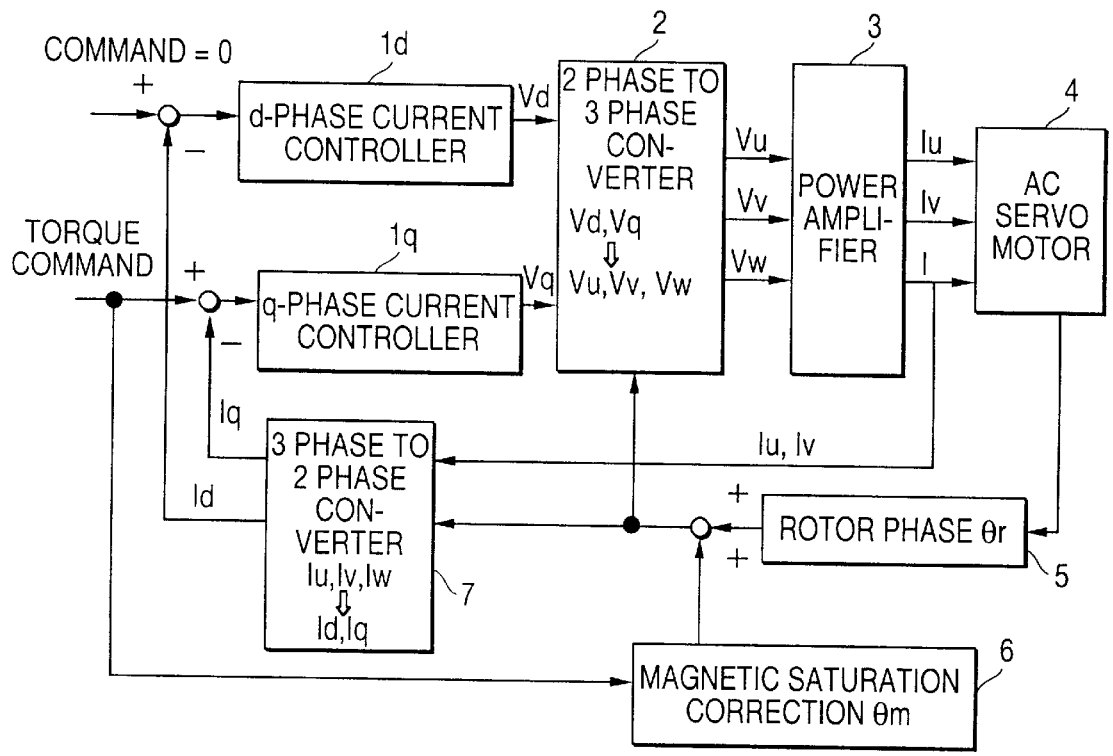
FIG. 1 is a block diagram showing control of current to an AC servo motor which drives a movable part of an injection molding machine in one embodiment according to the present invention.
Figure 3:
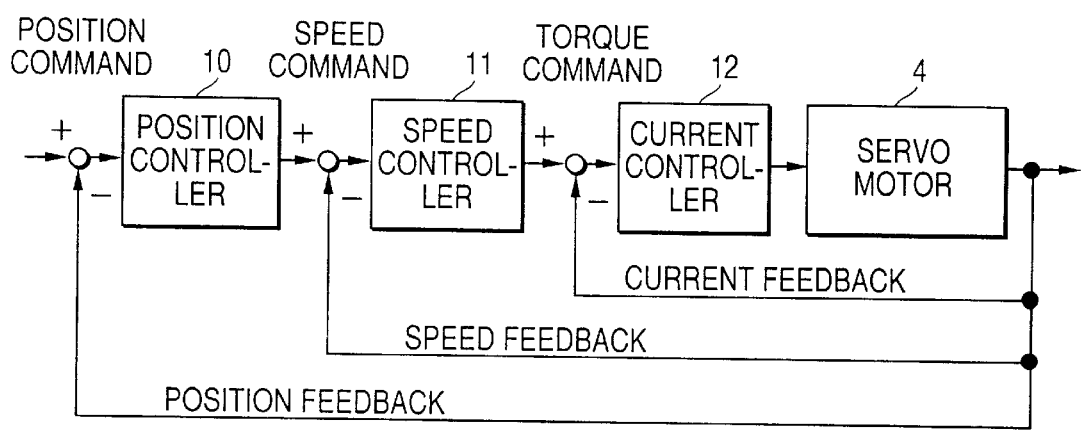
FIG. 3 is a block diagram showing control of position, speed and current loops of a servo motor.
Figure 2:
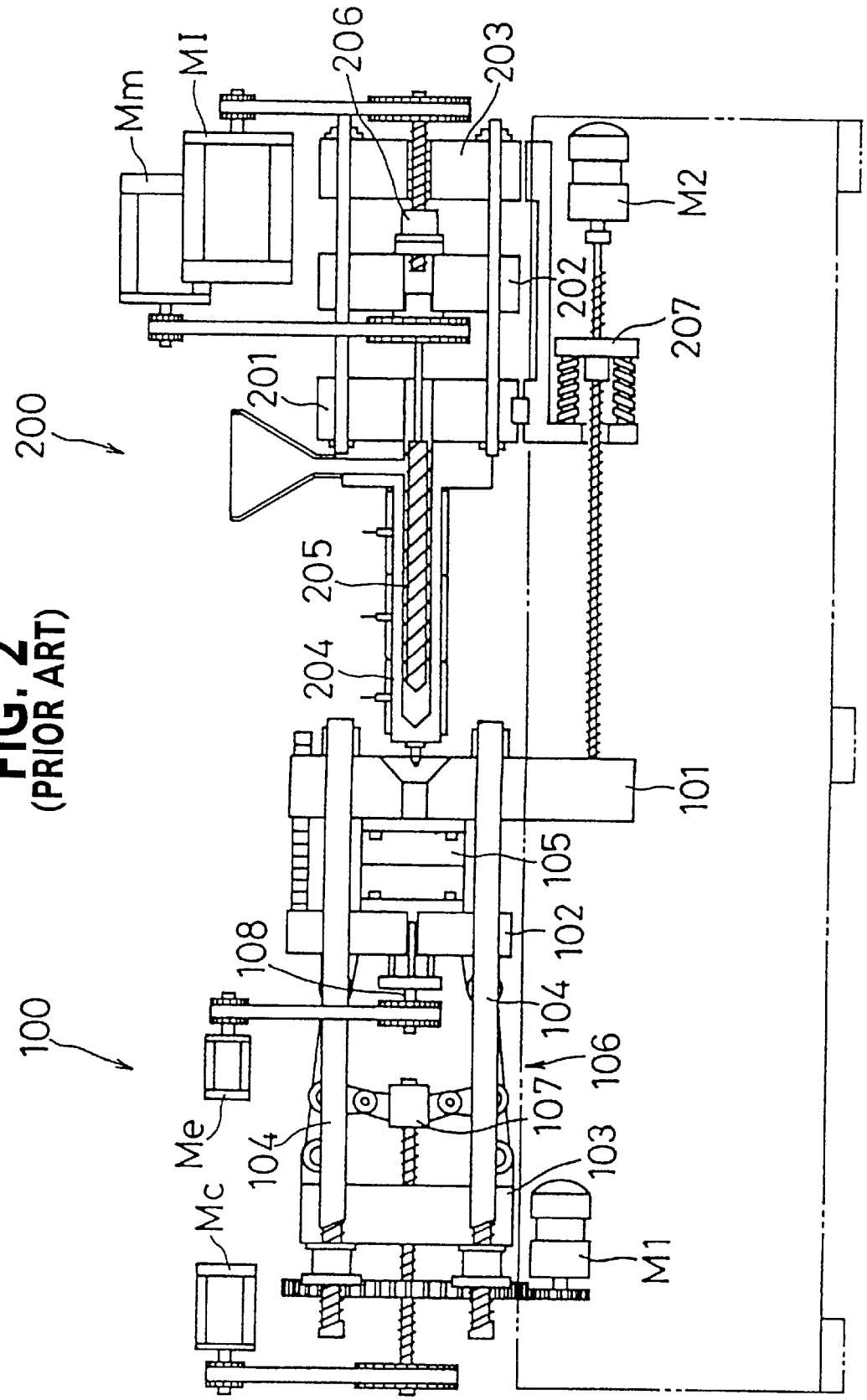
FIG. 2 is a view showing an outline of an injection molding machine, in which a movable part is driven by an AC servo motor.

FIG. 1 is a block diagram showing a current control section which performs control of current through d-q conversion in one embodiment according to the present invention, wherein a current control section of AC servo motors Mc, Me, Mm and M1 to drive a movable part of the injection molding machine is formed by a current control section in the block diagram of FIG. 1, and a block of a current control section 12 and that of a servo motor 4 shown in FIG. 3 are equivalent to the block diagram of FIG. 1.

Referring to FIG. 1, a d-phase current controller id outputs d-phase command voltage Vd through control of d-phase current loop, and a q-phase current controller 1q outputs q-phase command voltage Vq through control of q-phase current loop. Further, a two phase-to-three phase converter 2 receives the d-phase command voltage Vd, the q-phase command voltage Vq and a corrected rotor phase θ (which will be described infra) and converts the d-phase command voltage Vd and the q-phase command voltage Vq into command voltages Vu, Vv and Vw of three phases, i.e., U-, V- and W-phases through arithmetic operation according to the following expression (1).

$$\begin{bmatrix} Vu \\ Vv \\ Vw \end{bmatrix} = \sqrt{2/3} \begin{bmatrix} \cos\theta & -\sin\theta \\ \cos(\theta - 2\pi/3) & -\sin(\theta - 2\pi/3) \\ \cos(\theta + 2\pi/3) & -\sin(\theta + \pi/3) \end{bmatrix} \cdot \begin{bmatrix} Vd \\ Vq \end{bmatrix} \quad (1)$$

Further, reference numeral 3 denotes a power amplifier formed by an inverter or the like, 4 is an AC servo motor representing any one of the AC servo motors Mc, Me, Mm and M1, 5 is a rotor phase detector to detect a rotor phase r of the AC servo motor, and 6 is a magnetic saturation correcting means to correct a rotor phase when magnetic saturation occurs inside the AC servo motor 4 as will be described infra. Further, a reference numeral 7 is a three phase-to-two phase converter to convert currents Iu, Iv and Iw of three phases, i.e., U-, V- and W-phases into d-phase current Id and q-phase current Iq, and this converter 7 finds the d-phase current Id and the q-phase current Iq through arithmetic operation according to the following expression (2) on the basis of the currents of any two phases (Iu and Iv in FIG. 1) out of actual currents Iu, Iv and Iw of the respective phases of the AC servo motor, which are detected by a current detector (not shown), and a corrected rotor phase θm resulting from adding a correction value θm to the detected rotor phase θr.

$$\begin{bmatrix} Id \\ Iq \end{bmatrix} = \sqrt{2} \begin{bmatrix} \sin(\theta + \pi/3) & \sin\theta \\ \cos(\theta + \pi/3) & \cos\theta \end{bmatrix} \cdot \begin{bmatrix} Iu \\ Iv \end{bmatrix} \quad (2)$$

A description will now be given of the operation of the current control mode. In this current control mode, a deviation between the currents of d- and q-phases is found by respectively subtracting the currents Id and Iq of d- and q-phases outputted from the three phase-to-two phase converter 7 from a phase command value for each phase on condition that the current command of d-phase is set to "0", and the current command of q-phase is adapted for a torque command issued from the speed loop (the speed control section 11 shown in FIG. 3), and the d-phase command voltage Vd and the q-phase command voltage Vq are found through control of proportional plus integral control current loop performed by the current controllers 1d and 1q in a manner similar to the prior art. Further, the found command voltages Vd and Vq of d- and q-phases are converted into command voltages Vu, Vv and Vw of U-, V- and W-phases by the two phase-to-three phase converter 2, this command voltage is outputted to the power amplifier 3 to let the currents Iu, Iv and Iw flow in respective phases of the AC servo motor 4 through the inverter or the like to drive and control the AC servo motor 4.

Figure 4:
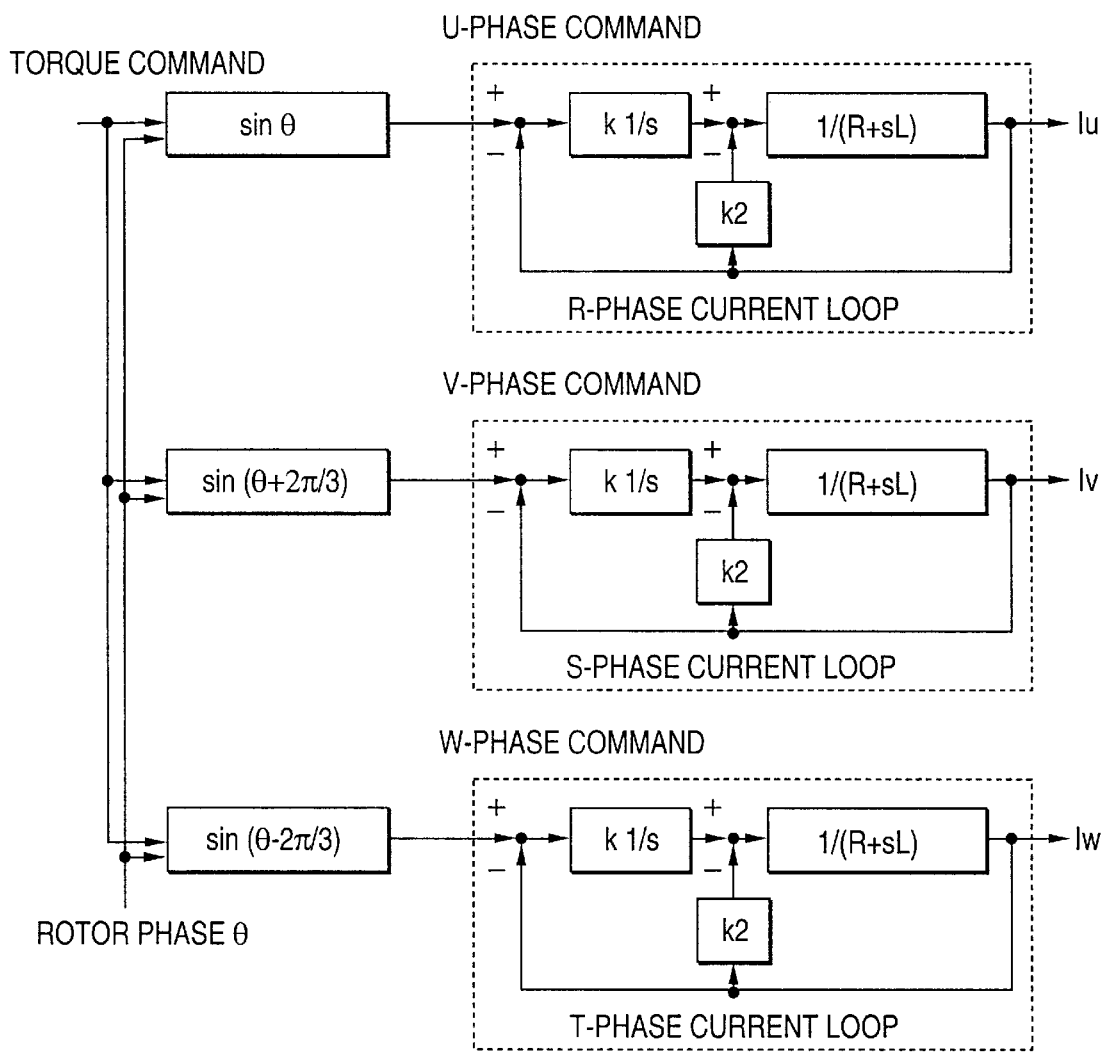
FIG. 4 is a block diagram showing control of current loop in the prior art.

For the control of current after conversion into two phases through d-q conversion as described above, since there occurs no phase lag in the current loop, and the actual current of d-phase is controlled to become equal to the command value "0", only the current of q-phase becomes effective, so that drive current to be applied to the AC servo motor decreases to cause a reduction of a heating value of the motor, resulting in a drop of a load level which brings about overheating. Thus, it becomes possible to increase the speed of the molding cycle of the injection molding machine. Further, in control of current for each of three phases in the prior art as shown in FIG. 4, torque characteristics are deteriorated due to phase lag or the like in a high-speed revolution range, and the reduction of torque hinders the increase of revolution speed, whereas, according to the present invention, the current is controlled after converting the three phases into two phases through d-q conversion, the phase lag will not occur substantially because of the operating principle of the control mode, and the high-speed operation can be made possible, resulting in a shortening of the molding cycle.

However, in case where a rare earth magnet is used as a magnet provided in the rotor of the AC servo motor, magnetic saturation is apt to occur in a magnetic circuit inside the motor. In a state that no magnetic saturation occurs in the magnetic circuit inside the motor, the torque produced with an increase of supply current (Iq) is increased according to a torque constant Kt. However, if the supply current (Iq) is increased, and the magnetic circuit enters the magnetic saturation state, for instance, a maximum torque that can be produced by the motor becomes lower than a torque value determined according to the torque constant Kt.

Therefore, according to the present invention, the magnetic saturation correction θm is applied to the rotor phase θr by the magnetic saturation correcting means 6 shown in FIG. 1 at the time of high-speed revolution, which brings about the magnetic saturation, to advance the phase of the q-phase current Iq, thereby preventing the torque from decreasing during high-speed revolution described above.

Figure 5:
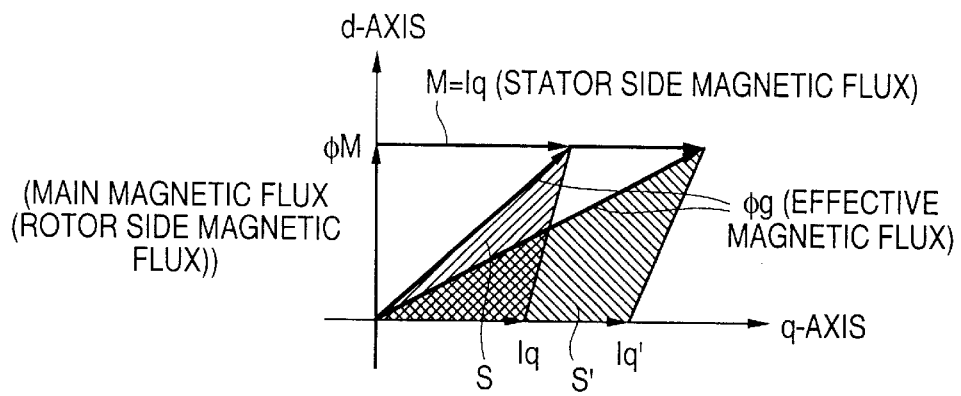
FIG. 5 is a graph showing a magnetic flux vector on d-q coordinates of a servo motor.
Figure 6:
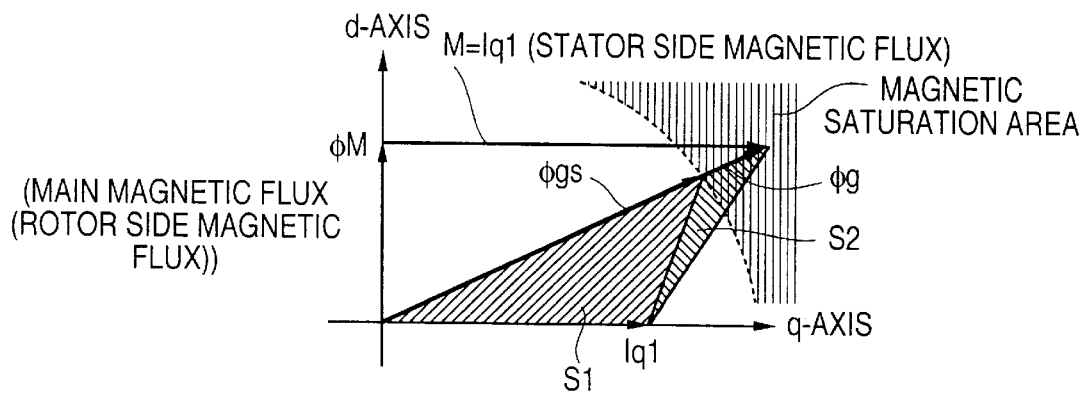
FIG. 6 is a graph showing a magnetic flux vector on d-q coordinates of a servo motor.
Figure 7:
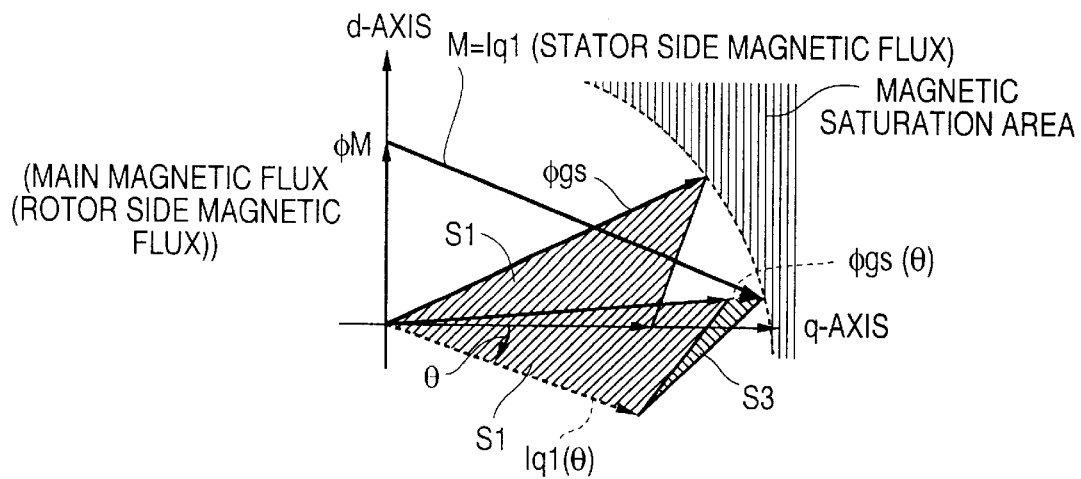
FIG. 7 is a graph showing a magnetic flux vector on d-q coordinates of a servo motor.

A description will now be given of the magnetic saturation correction. FIGS. 5, 6 and 7 show magnetic flux vectors on d-q coordinates of the AC servo motor respectively, wherein a direction of magnetic flux (main magnetic flux φM) of a permanent magnet of the rotor is represented by d-axis, and a direction of magnetic flux M·Iq produced by the effective current Iq is represented by q-axis. Incidentally, the d-axis and the q-axis are orthogonal to each other. Accordingly, a resultant magnetic flux obtained by adding the main magnetic flux φM produced by the permanent magnet of the rotor to the magnetic flux M·Iq produced by the effective current Iq in vectorial representation provides a magnetic flux φg effective in producing the torque. Torque T produced at this time is given by an outer product of the effective magnetic flux φg and the effective current Iq according to the following expression (3).

$$T = \phi g \times Iq = (\phi M + M \cdot Iq) \times Iq \quad (3)$$

In this case, the torque T is in proportion to an area S shown in FIGS. 5, 6 and 7.

Referring to FIG. 5, the area is increased from S to S' with an increase of the q-phase current from Iq to Iq', and the produced torque T is also increased. The effective magnetic flux φg is increased with a further increase of the q-phase current, resulting in an occurrence of magnetic saturation in the magnetic circuit inside the motor. When the effective magnetic flux lies in the magnetic saturation area, the effective magnetic flux will not increase in proportion to the increase of the q-phase current Iq, with the result that the torque will not increase any further. In FIG. 6 showing the magnetic flux vector, a portion hatched with vertical lines schematically shows the magnetic saturation area, the magnetic flux φg produced by an increased q-phase current Iq1 lies in the magnetic saturation area, and as a result, an actually-produced magnetic flux φgs becomes smaller than φg due to magnetic saturation. Thus, when comparing the magnitude of produced torque in terms of the area S in the drawing, torque to be obtained primarily corresponds to (S1+S2), whereas the torque to be actually-produced is given by only S1 due to the magnetic saturation, resulting in a decrease of torque with a ratio of S2/(S1+S2).

In the magnetic saturation correction according to the present invention, control is made such that the magnetic flux φg will not enter the magnetic saturation area by advancing the phase of the q-phase current Iq to prevent the torque portion from decreasing. In FIG. 6 showing the magnetic flux vector, if the phase of the q-phase current Iq is advanced by θ when a magnetic flux φgs produced by the q-phase current Iq in the direction of the q-axis has reached the magnetic saturation area, an allowance becomes available between the magnetic flux φgs and the magnetic saturation area, and as a result, it becomes possible to supply higher q-phase current Iq1(θ). In this case, a magnetic flux φgs(θ) can be made greater than θ gs, and, comparing the produced torques in terms of the area S in the drawing, the torque produced in case where the magnetic saturation correction is made by advancing the phase of the q-phase current Iq by θ is (S+S3), whereby the torque can be increased by a ratio of S3/S1 with respect to the torque S1 to be produced in case where no magnetic saturation correction is made in this case.

When the torque is represented in terms of the area S, the relation between the torque S3 increased by the magnetic saturation correction in FIG. 7 and the torque S2 in FIG. 6 is S3<S2 so that, in this case, the torque can be increased although it does not reach the maximum torque which can be produced when no magnetic saturation occurs.

Figure 8A:
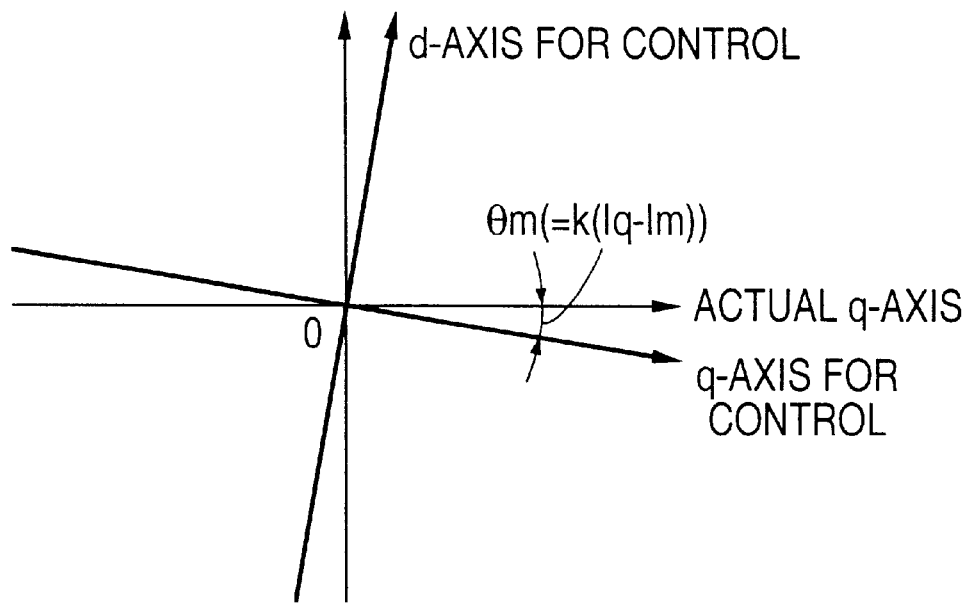
FIG. 8A is a graph for explaining phase-lead control of q-phase current.
Figure 8B:
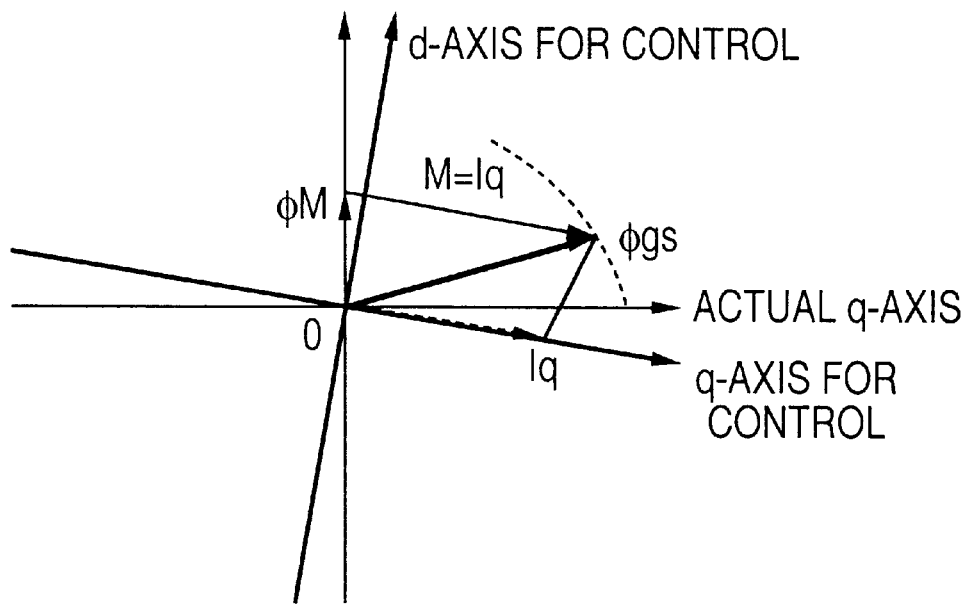
FIG. 8B is a graph for explaining that control is made by d-q coordinates, in which a phase is allowed to lead by θm from actual d-q coordinates.

Control of phase lead of the q-phase current can be made by advancing the d-q coordinates for control with respect to the actual d-q coordinates by actually advancing the rotor phase to be detected by the rotor phase detector, and control mode viewed from the control system is similar to a conventional control. FIGS. 8A and 8B are graphs for a comparison between the d-q coordinates for control and the actual d-q coordinates. Referring to FIG. 83A, control for advancing the phase of the q-phase current corresponds to advancing the phase of the d-q coordinates for control by θm with respect to the actual d-q coordinates. Referring to FIG. 8B, control by the control system is made on the d-q coordinates for control, in which the phase is advanced by θm with respect to the actual d-q coordinates, and the magnetic saturation correction may be made by flowing the q-phase current toward the q-axis of the d-q coordinates. Thus, it can be said that, viewed from the control system, a control equivalent to a conventional control is made in this case.

Figure 9:
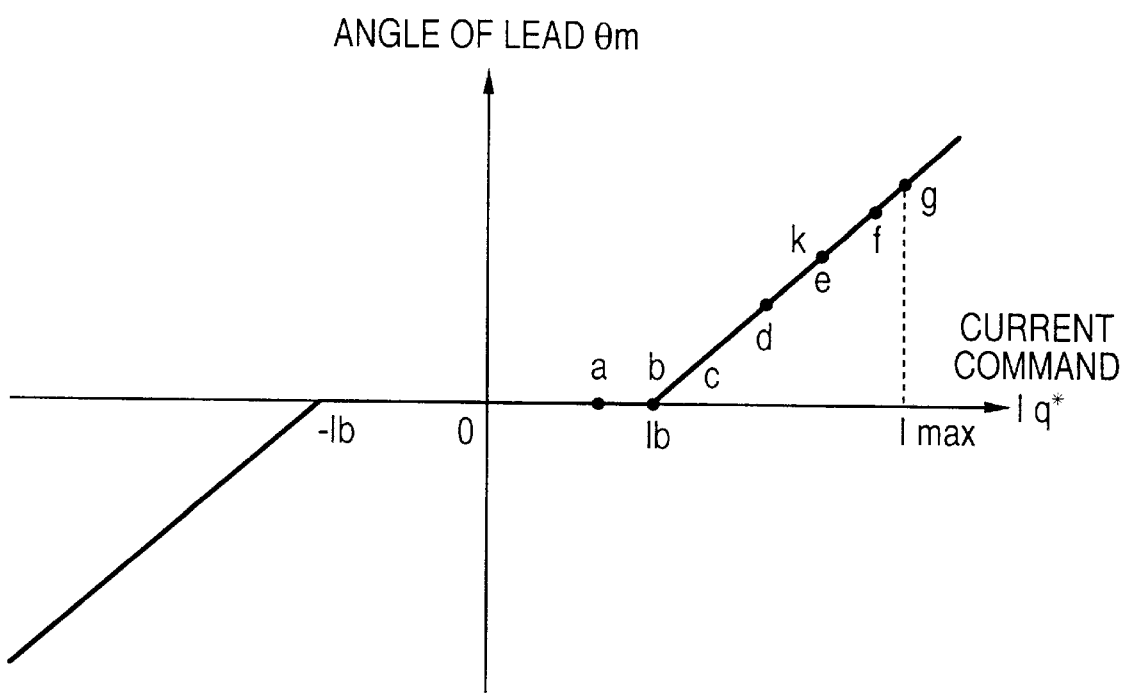
FIG. 9 is a graph for explaining an angle of phase lead θm.

A description will now be given of an angle of lead θm in the magnetic saturation correction according to the present invention. FIG. 9 shows an instance of the angle of lead θm, which is given with respect to a current command. Referring to FIG. 9, the angle of lead θm is set to "0°" when a current command Iq* is not more than a predetermined value Ib, and the angle of lead θm is increased in proportion to the current command Ib when the current command Iq* exceeds the predetermined value Ib. The angle of lead θm shown in FIG. 9 is given by the following expressions (4) and (5).

When abs(1q*)>Ib, $$\theta m = k(\text{abs}(Iq^*) - Ib)\text{sign}(Iq^*) \qquad (4)$$

When abs(Iq*)<Ib, $$\theta m = 0 \qquad (5)$$

Incidentally, Iq* denotes q-phase command current, Ib is a current value which specifies the magnitude of the current command in the stage of beginning to enter the magnetic saturation area, K is a proportional constant, abs is an absolute value, and sign is a sign. In this case, the proportional constant K is the coefficient of magnetic saturation, to be determined according to magnetic saturation characteristics of the individual motor, and can be determined by experimentation.

Thus, when the current command Iq* is so small that the magnetic flux produced by this current command will not enter the magnetic saturation area, there is no need of carrying out magnetic saturation correction, and, therefore, control of the motor is made with the angle of lead θm set to 0° without carrying out phase control of the current command Iq*. On the other hand, when the current command Iq* becomes so large that the magnetic flux produced by this current command will enter the magnetic saturation area, there is a need of carrying out magnetic saturation correction, control of the motor is made with the angle of lead θm given for advancing the phase according to the degree of magnetic saturation. The lead of the phase according to the degree of magnetic saturation may be determined according to the degree how the current command Iq* exceeds the value Ib of the current command in the stage of beginning to enter the magnetic saturation area, and may be set according to a difference between the current command Iq* and the current value Ib.

Figure 10:
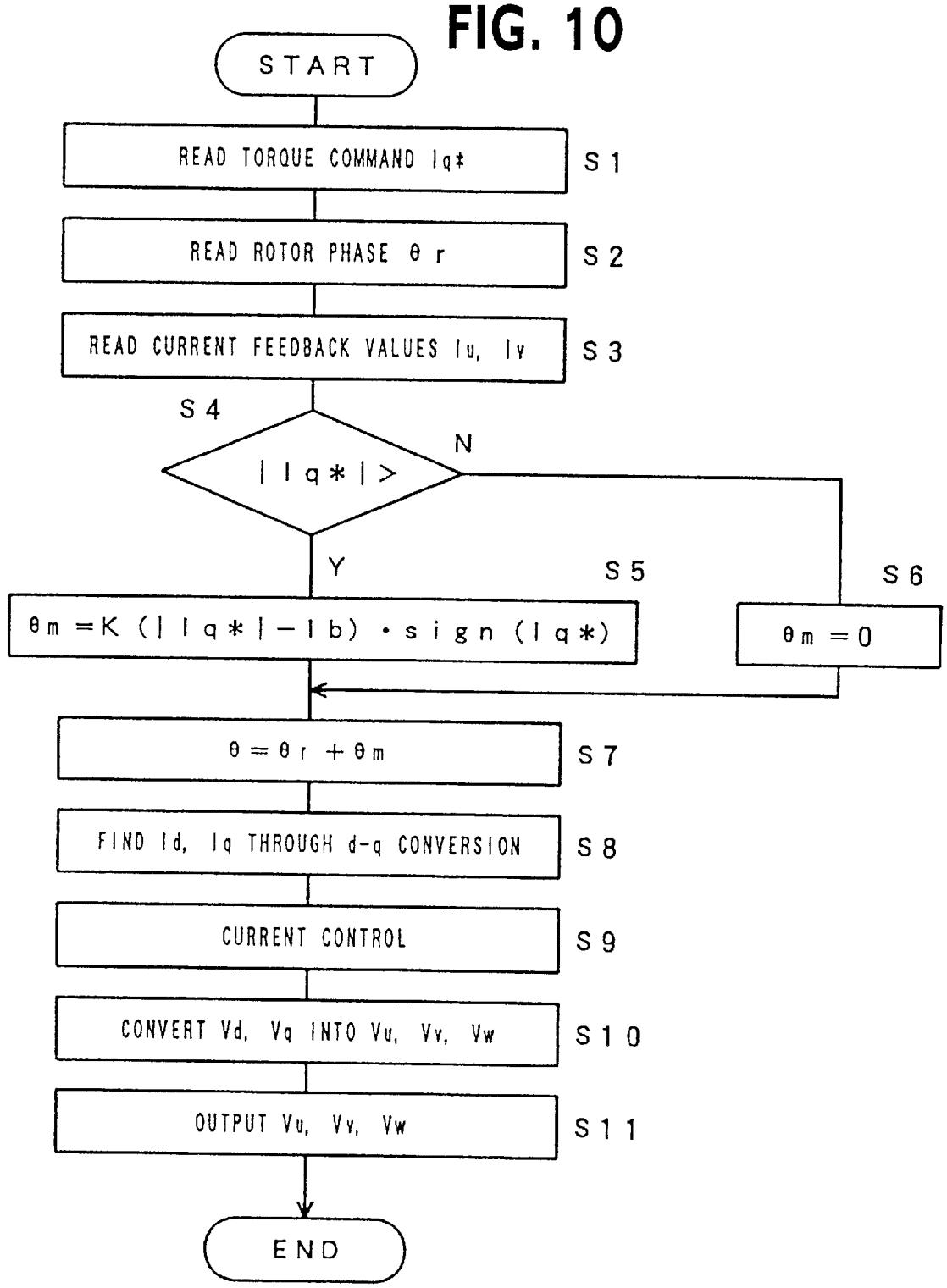
FIG. 10 is a flow chart showing current loop processing performed by a processor of a digital servo circuit in each cycle of current loop processing in one embodiment according to the present invention.

FIG. 10 is a flow chart showing the processing performed every cycle of current loop processing by a processor of a digital servo circuit to control each servo motor in the control device to control the injection molding machine. Incidentally, the structure of the injection molding machine and that of the digital servo motor are identical with those in the prior art, and hence, the description thereof will be omitted.

The processor of the digital servo circuit performs position loop processing and speed loop processing (processing in the position control section 10 and that in the speed control section 11 shown in FIG. 3) in the similar manner to the prior art on the basis of an issued position command (or speed command) and finds a torque command (a current command) Iq*. Then, in the cycle of current loop processing, the processor reads the current command (the torque command) Iq* (Step S1) and also reads the rotor phase θr from the rotor phase detector and current feedback values Iu and Iv of u- and v-phases (Steps S2 and S3).

Subsequently, the processor determines whether or not an absolute value of the read torque command (the current command) Iq* exceeds the current value Ib at which the magnetic saturation is assumed to occur (Step S4), and sets an amount of phase correction θm to "0" when not exceeding, or finds an amount of phase correction θm through the arithmetic operation according to the above expression (4) when exceeding (Steps S6 and S5). Then, the processor finds a corrected rotor phase θ obtained by adding the amount of phase correction θm to the rotor phase θr read in Step S2 (Step S7) and converts the currents Iu, Iv and Iw of three phases into currents Id and Iq of two phases through the arithmetic operation using the above expression (2) on the basis of the corrected rotor phase θ and the current feedback values Iu and Iv of u- and v-phases read in Step S3 (Step S8). Then, the processor finds the d-phase command voltage Vd through normal current loop processing (proportional plus integral control) on condition that the converted d-phase current Id is adapted for the feedback current, and the d-phase current command is set to "0". Further, the processor finds the q-phase voltage command Vq through current loop processing on condition that the current command Iq* read in Step S1 is adapted for the current command of q-phase, and the current value Iq of q-phase calculated in Step S8 is adapted for the feedback current (Step S9).

The processor converts the voltages Vd and Vq of two phases into voltages Vu, Vv and Vw of three phases through d-q conversion by the arithmetic operation according to the above expression (1) on the basis of the d- and q-phase command voltages Vd and Vq and the rotor phase θ advanced by correction in Step S7, and outputs the above voltages of three phases as the voltage command (PWM command) to the power amplifier 6 (Steps S10 and S11). The power amplifier performs PWM control in an inverter and supplies the currents Iu, Iv and Iw of the respective phases to the AC servo motor 4 to drive the AC servo motor.

Figure 11A:
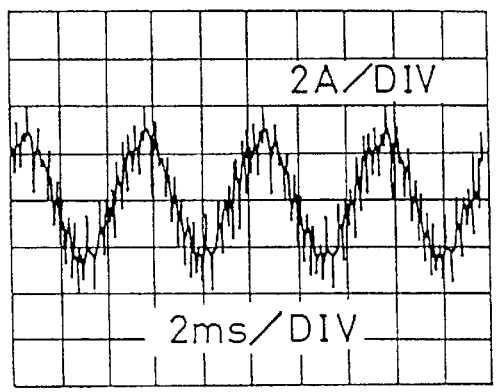
FIG. 11A is a diagram showing the current which actually flows in a servo motor when applying a method of current control on a conventional three-phase basis to the servo motor.
Figure 11B:
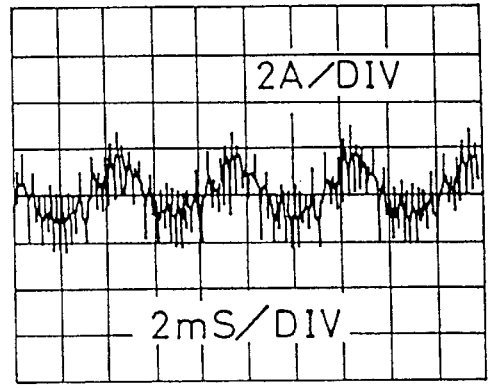
FIG. 11B is a diagram showing the current which actually flows in a servo motor when applying a method of current control according to the present invention to the servo motor.

FIGS. 11A and 11B show the results of experiments conducted to observe a difference between the control method in the prior art and that according to the present invention, in which values of current flowing to the AC servo motor in the case of the current control method by prior art and in the case of the current control method according to the present invention are measured under the same load, a section on the axis of abscissa being 2 ms, and a section on the axis of ordinate being 2A.

FIG. 11A shows the results of experiments according to the method of current control on a three-phase basis by the prior art, while FIG. 11B shows the results of the experiments when control of current is made through d-q conversion according to the present invention. As is apparent from FIGS. 11A and 11B, the current value by the current control method of the present invention is smaller due to the absence or decrease of ineffective current (the d-phase current), in comparison with the current control method by the prior art.

Figure 12A:
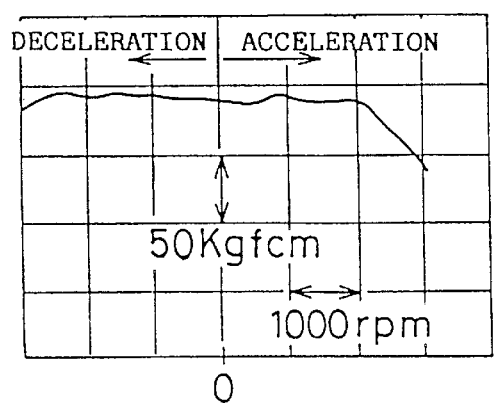
FIG. 12A is a diagram showing the maximum output torque of a servo motor when applying a method of current control on a conventional three-phase basis to the servo motor.
Figure 12B:
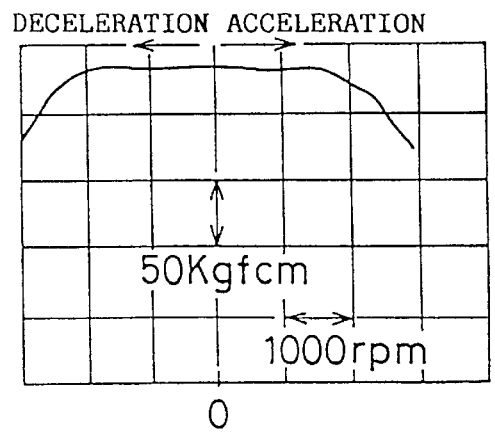
FIG. 12B is a diagram showing the maximum output torque of a servo motor when applying a method of current control according to the present invention to the servo motor.

FIGS. 12A and 12B show the results of measurement of the maximum torque, and it is found that the available maximum torque produced according to the current control method of the present invention shown in FIG. 12B is higher by 20 to 30 percent than that produced by the current control method by the prior art shown in FIG. 12A. It is also found that the current control method of the present invention enables the production of a higher torque even in the area of the high-speed revolution, in comparison with the current control method by the prior art.

Figure 13:
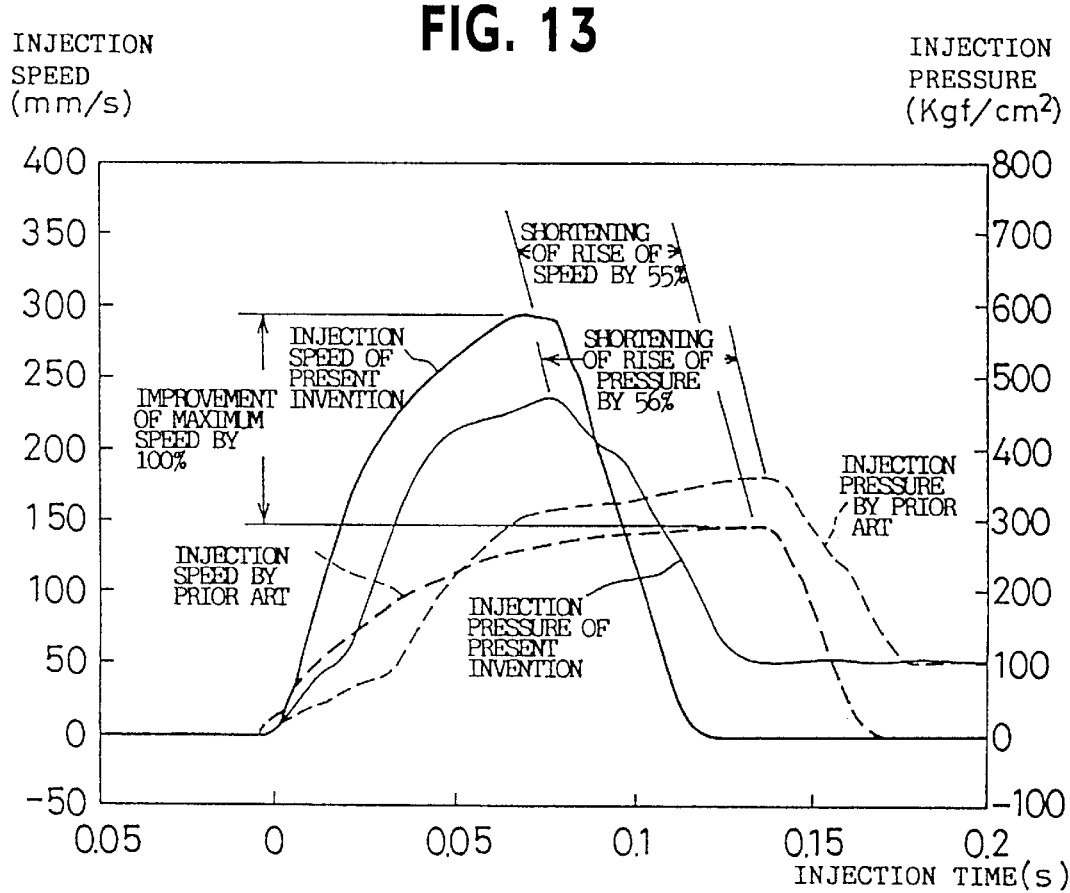
FIG. 13 is a diagram showing the results of experiments for comparison between a current control method in the prior art and that according to the present invention with respect to injection speed and injection pressure on the basis of injection axis of an injection molding machine.

FIG. 13 shows the results of measurement of injection speed and injection pressure when the method by the prior art and that of the present invention applied for the control of current to a servo motor M1 which drives the injection axis of the injection molding machine. Incidentally, solid lines show the results according to the method of the present invention, while broken lines show the results according to the method by the prior art. As is apparent from FIG. 13, the rise time of the injection speed according to the method of the present invention is shortened by 55%, and the rise time of the injection pressure is also shortened by 56%, in comparison with the method in the prior art. Further, with the present invention, a maximum speed up to a value which is twice as much as the maximum speed by the prior art can be attained. Besides, the present invention enables the production of a injection pressure which is much higher than that by the prior art.

What is claimed is:

1. A method of controlling current to an AC servo motor, comprising:

controlling the current to the motor using a d-phase magnetic flux-producing current and an orthogonal q-phase current obtained by converting the current from the motor from three phases to two phases; and increasing a maximum torque by advancing the phase of the q-phase current when a torque command is greater than or equal to a current value at which magnetic saturation occurs.

2. An injection molding machine with a movable part driven by an AC servo motor, comprising:

a current controller controlling current to the motor using a d-phase magnetic flux-producing current and an orthogonal q-phase current obtained by converting the current from the motor from three phases to two phases; and a magnetic saturation controller increasing a maximum torque by advancing the phase of the q-phase current when a torque command is greater than or equal to a current value at which magnetic saturation occurs.

3. An injection molding machine of which a movable part is driven by an AC servo motor, characterized in that current to said AC servo motor is controlled by making use of d-q conversion effective in making conversion from three phases into two phases, which is composed of a d-phase in a direction of magnetic flux produced by a field system and a q-phase orthogonal to the d-phase, and wherein the maximum torque is increased by making phase-lead control which advances the phase of said q-phase current in the case when said torque command is not less than a value of current at which magnetic saturation occurs.

4. An injection molding machine of which a movable part is driven by an AC servo motor, characterized in that drive of said AC servo motor is controlled by obtaining, as feedback currents, d-phase current in a direction of magnetic flux produced by a field system and q-phase current orthogonal to said d-phase current through conversion from three phases into two phases on the basis of drive current of said AC servo motor and a rotor phase, finding command voltages of d- and q-phases through feedback control of current on condition that a torque command is adapted for a q-phase current command and the d-phase current command is set to 0, and then finding the command to each phase of the AC servo motor through conversion from two phases into three phases on the bases of the command voltages of d- and q-phases, and wherein the maximum torque is increased by making phase-lead control which advances the phase of said q-phase current in the case when said torque command is not less than a value of current at which magnetic saturation occurs.

5. A current control method of an AC servo motor to drive a movable part of an injection molding machine, comprising the steps of:

finding d-phase current in a direction of magnetic flux produced by a field system and q-phase current orthogonal to the d-phase current through d-q conversion on the basis of drive current of said AC servo motor and a phase of a rotor;

finding d-phase command voltage on the basis of the d-phase current command and the d-phase current, and also finding q-phase command voltage on the basis of the q-phase current command and the q-phase current, on condition that the d-phase current command is set to zero and the q-phase current command is adapted for a torque command issued from a speed loop;

advancing the phase of said q-phase current command by an angle corresponding to a value of said q-phase current command; and converting the command voltages of d- and q-phases into voltages of three phases to find currents of three phases to be supplied to the motor on the basis of said voltages of three phases.

6. An injection molding machine of which a movable part is driven by an AC servo motor of three phases, wherein:

said AC servo motor comprises:

individual phase current detection means to detect actual currents of at least two phases of the AC servo motor of three phases;

a phase detection means to detect a phase of a rotor of said AC servo motor;

a three phase-to-two phase conversion means to output d-phase current in a direction of magnetic flux produced by a field system and q-phase current orthogonal to the d-phase current in response to the output received from said each phase current detection means and the output received from said phase detection means;

a d-phase current control means to find and output d-phase command voltage on the basis of a deviation between a d-phase current command and said d-phase current;

a q-phase current control means to find and output q-phase command voltage on the basis of a deviation between a q-phase current command and said q-phase current;

a two phase-to-three phase conversion means to convert, into voltages of three phases of said AC servo motor, the output from said d-phase current control means and the output from said q-phase current control means;

a power amplifying means to convert, into current to be supplied to the three phases of said AC servo motor, the output received from said two phase-to-three phase conversion means; and a magnetic saturation correcting means to output an angle of lead corresponding to a q-phase current command value to said phase detecting means in response to the received q-phase current command;

wherein said phase detecting means outputs to said three phase-to-two phase conversion means a value resulting from adding the angle of lead received from said magnetic saturation correcting means to the rotor phase of the AC servo motor, detected by said phase detecting means.

* * * * *